United States Patent
Honary et al.

(10) Patent No.: US 6,449,664 B1
(45) Date of Patent: Sep. 10, 2002

(54) TWO DIMENSIONAL DIRECT MEMORY ACCESS IN IMAGE PROCESSING SYSTEMS

(75) Inventors: Hooman Honary, Newport Beach; Anatoly Moskalev, Irvine, both of CA (US)

(73) Assignee: ViewAhead Technology, Inc., Redmond, WA (US)

( * ) Notice: Subject to any disclaimer, the term of this patent is extended or adjusted under 35 U.S.C. 154(b) by 0 days.

(21) Appl. No.: 09/192,616

(22) Filed: Nov. 16, 1998

(51) Int. Cl.[7] .......................... G06F 13/14; G06F 13/16
(52) U.S. Cl. ........................... 710/22; 710/10; 710/25; 710/35; 711/149; 712/10; 712/14
(58) Field of Search ................ 710/1, 22, 25, 710/35; 712/10, 14; 711/149

(56) References Cited

U.S. PATENT DOCUMENTS

| | | | |
|---|---|---|---|
| 4,481,578 A | | 11/1984 | Hughes et al. ............ 709/212 |
| 5,247,627 A | * | 9/1993 | Murakami et al. .......... 395/375 |
| 5,303,341 A | | 4/1994 | Rivshin ..................... 345/526 |
| 5,522,080 A | * | 5/1996 | Harney ...................... 395/727 |
| 5,694,331 A | * | 12/1997 | Yamamoto et al. ...... 364/514 A |
| 6,016,386 A | * | 1/2000 | Nosaki et al. .............. 395/114 |
| 6,064,755 A | * | 5/2000 | Some ......................... 382/132 |
| 6,067,604 A | * | 5/2000 | Ramachandran et al. ... 711/149 |

FOREIGN PATENT DOCUMENTS

| EP | 0705023 A2 | 3/1996 |
|---|---|---|
| EP | 0817096 A2 | 7/1998 |

OTHER PUBLICATIONS

IBM TDB, 'Image Scaling With Two-Dimensional Memory Arrays', vol. 34, Issue #2, pp. 4-9, Jul. 1991.*

* cited by examiner

Primary Examiner—Jeffrey Gaffin
Assistant Examiner—Rehana Perveen
(74) Attorney, Agent, or Firm—Akin, Gump, Strauss, Hauer & Feld, LLP; Christopher J. Rourk

(57) ABSTRACT

A two-dimensional direct memory access system that maximizes processing resources in image processing systems. The present invention includes a two-dimensional direct memory access machine. Also, it employs a ping-pong style memory buffer to assist in the transfer and management of data. In certain applications of the invention, the type of data used by the invention is image data. The two-dimensional direct memory access machine transfers a specific cross sectional area of the image data to a processor. The efficient method of providing the processor only with the specific cross sectional area of the image data that is to be processed at a given time provides decreased processing time and a better utilization of processing resources within the two-dimensional direct memory access system. The present invention may be contained in a variety of image processing systems operating as either a peripheral or a stand alone device including but not limited to color photo-copy machines, color facsimiles, color printers, black and white printers, digital cameras, and digital printers. In certain embodiments, the two-dimensional direct memory access system exchanges image data between random access memory and a digital signal processor using the two-dimensional direct memory access machine and the ping-pong style memory buffer.

20 Claims, 3 Drawing Sheets

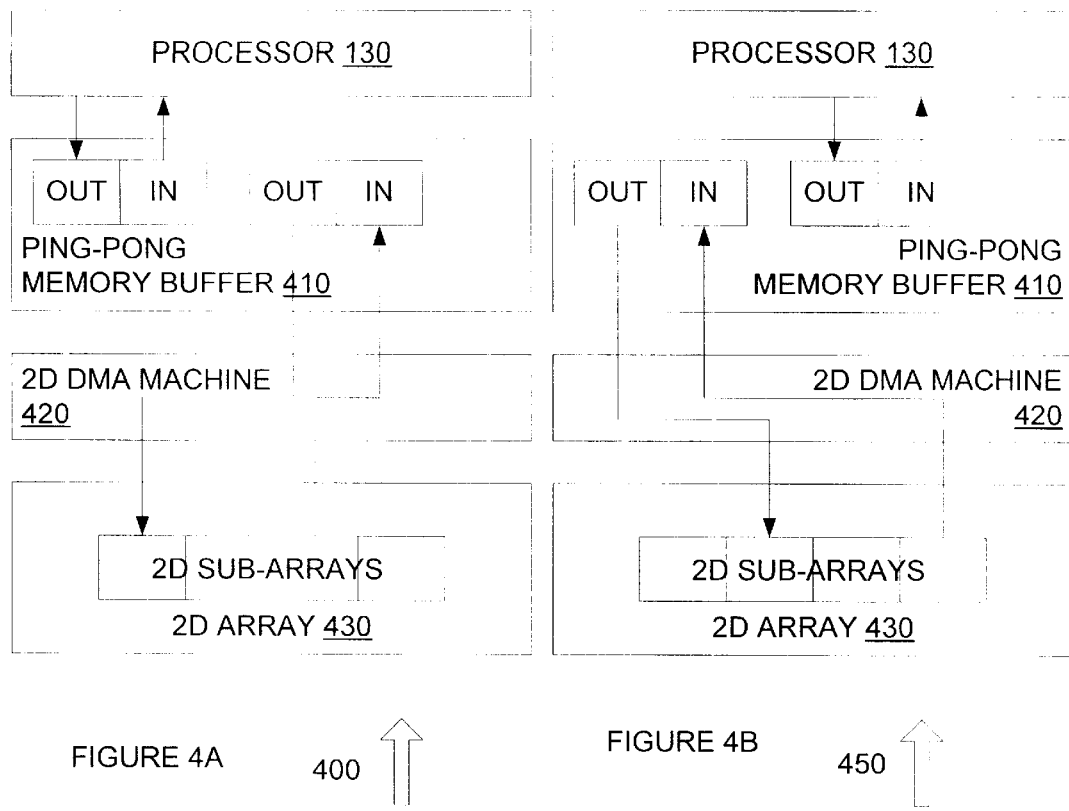
FIGURE 4A
FIGURE 4B
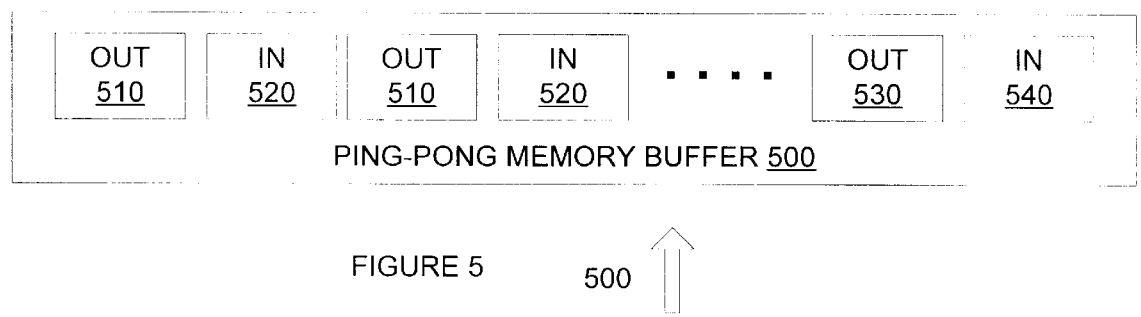
FIGURE 5

TWO DIMENSIONAL DIRECT MEMORY ACCESS IN IMAGE PROCESSING SYSTEMS

BACKGROUND

1. Technical Field

The present invention relates generally to data management; and, more particularly, it relates to image data management and transfer within image processing systems.

2. Description of Prior Art

Conventional data management systems typically employ a cache memory in between a processor and random access memory to overcome the operating frequency mismatch between the two devices which inevitably slows processing rates. In data management systems that employ a significant amount of random access memory, relatively long electrical traces are often required to interconnect the various elements. Long traces that connect various elements within data management and communication systems suffer from deleterious capacitance thereby greatly limiting maximum data transfer rates. Typical maximum operating frequencies with respect to data transfer are in the tens of megahertz range for random access memory and in the hundreds of megahertz range and greater for modern processors. Modern digital signal processors typically provide some of the highest operating frequencies in the art.

The traditional solution of installing expensive cache memory in between the random access memory and the processor is an intrinsically expensive solution to avoid the mismatch of operating frequencies given the high cost of cache memory. Low cost systems particularly suffer from this limitation in that very little, if any, cache memory is typically installed because of the relatively high cost associated with it. This high cost associated with cache memory prohibits the use of the traditional solution in many low cost applications. The types of applications that can justify utilizing cache memory are typically systems that have a very generous system budget with sufficient margin to accommodate the expensive cache memory. Absent an implementation of some solution such as the introduction of cache memory the operating frequency mismatch between the memory and the processor, a data transfer bottleneck occurs between the processor and the memory in such data management systems.

Conventional image processing systems that employ cache memory to assist in data management suffer from other operational limitations. The typical method in which image data is stored in memory creates an additional difficulty for traditional methods of data management in that the data are stored in a plurality of one-dimensional arrays coordinated by a common addressing scheme. While this traditional approach is sufficient to keep track of the data for later retrieval and use, the data are undesirably partitioned in a manner that precludes efficient processing on a two-dimensional subset of the data. A difficulty arises in image processing where only a predetermined two-dimensional cross sectional area is to be processed. For example, in many applications, modification of only a specific portion of an image is required. For these applications, the data management system must go into a whole host of individual one-dimensional arrays and extract only the requisite portion of data within each individual one-dimensional array to assemble the predetermined two-dimensional cross sectional area that is to be processed. Conventional data management systems that perform this extraction function are ill-suited to perform high speed image processing.

Further limitations and disadvantages of conventional and traditional systems will become apparent to one of skill in the art after reviewing the remainder of the present application with reference to the drawings.

SUMMARY OF THE INVENTION

Various aspects of the present invention can be found in a data management system that maximizes processing resources in image processing systems. A two-dimensional direct memory access system performs efficient transfer of a plurality of image data to a memory where it is then processed using a processor. The effective provision of the two-dimensional portion of a plurality of image data to the processor provides significantly reduced processing times than provided by conventional data management and processing systems.

In certain embodiments of the invention, the two-dimensional direct memory access system contains a two-dimensional direct memory access machine that operates cooperatively with a ping-pong memory buffer to maximize further the processing efficiency of the plurality of image data. The two-dimensional direct memory access machine transfers a specific cross sectional area of the plurality of image data to the processor. The efficient method of providing the processor only with the specific cross sectional area of the plurality of image data that is to be processed at a given time provides decreased processing time and a better utilization of processing resources within the two-dimensional direct memory access system.

Other aspects, advantages and novel features of the present invention will become apparent from the following detailed description of the invention when considered in conjunction with the accompanying drawings.

DRAWINGS

FIG. 4a is a system diagram illustrating an embodiment of a data management system built in accordance with the present invention that transfers two-dimensional data to a processor using a ping-pong memory buffer.

FIG. 4b is a system diagram depicting the data management system of FIG. 4a operating at a different point in time.

FIG. 5 is a system diagram illustrating a specific embodiment of a ping-pong memory buffer built in accordance with the present invention.

DETAILED DESCRIPTION OF DRAWINGS

The present invention operates within image processing systems that perform processing of a predetermined two-dimensional cross sectional area that is selected from a plurality of image data. It includes a data management system capable of performing high speed, efficient interfacing between a processor and a memory that stores a plurality of image data without the use of expensive cache memory. The invention is useful in a variety of applications, and it is especially well-suited for performing within image processing systems.

A data management system selects a predetermined two-dimensional cross sectional area from among the plurality of image data and transfers it to a processor. Such intelligent data transfer provides a data management system that minimizes the operating frequency mismatch that typically limits the maximum operational speed of conventional systems. The present invention provides an effective solution to the bottleneck commonly occurring between the processor and the memory of traditional data management systems.

Figure 1:
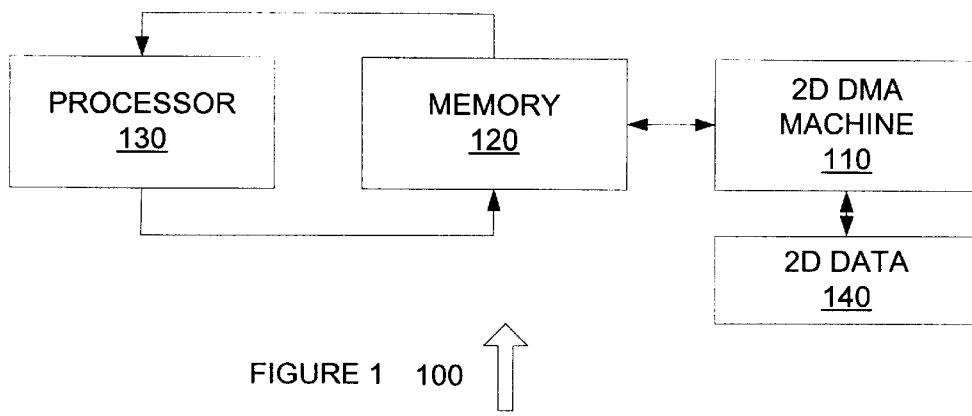
FIG. 1 is a system diagram illustrating an embodiment of a data management system built in accordance with the present invention that transfers two-dimensional data to a processor.

FIG. 1 is a system diagram illustrating an embodiment of a data management system 100 built in accordance with the present invention that transfers two-dimensional data to a processor. A two-dimensional direct memory access machine 110 operates to direct the transfer of a plurality of two-dimensional data 140 to a memory 120. The plurality of two-dimensional data 140 is then extracted from the memory 120 to be processed by a processor 130. Once the plurality of two-dimensional data 140 has been processed by the processor 130, it is returned to the memory 120. The two-dimensional direct memory access machine 110 then operates to return the plurality of two-dimensional data 140 to its original location and subsequently selects another plurality of two-dimensional data (not shown) for transferring to the memory 120 using the two-dimensional direct memory access machine 110 and perform processing on the another plurality of two-dimensional data.

In certain embodiments of the invention, the plurality of two-dimensional data 140 is a subset of another plurality of two-dimensional data (not shown). The two-dimensional direct memory access machine 110 selects the subset from the another plurality of two-dimensional data and transfers it to the memory 120 for processing by the processor 130. Subsequently, after the subset is returned to its original position after processing, another subset is selected from the another plurality of two-dimensional data. Various subsets of the another plurality of two-dimensional data are sequentially processed until the entirety of the another plurality of two-dimensional data is processed.

In certain embodiments, the processor 130 is a digital signal processor and the memory 120 is random access memory. In other embodiments, the memory 120 is partitioned among a plurality of devices which all operate cooperatively to perform the storing and providing of the plurality of two-dimensional data 140 to the processor 130.

Figure 2:
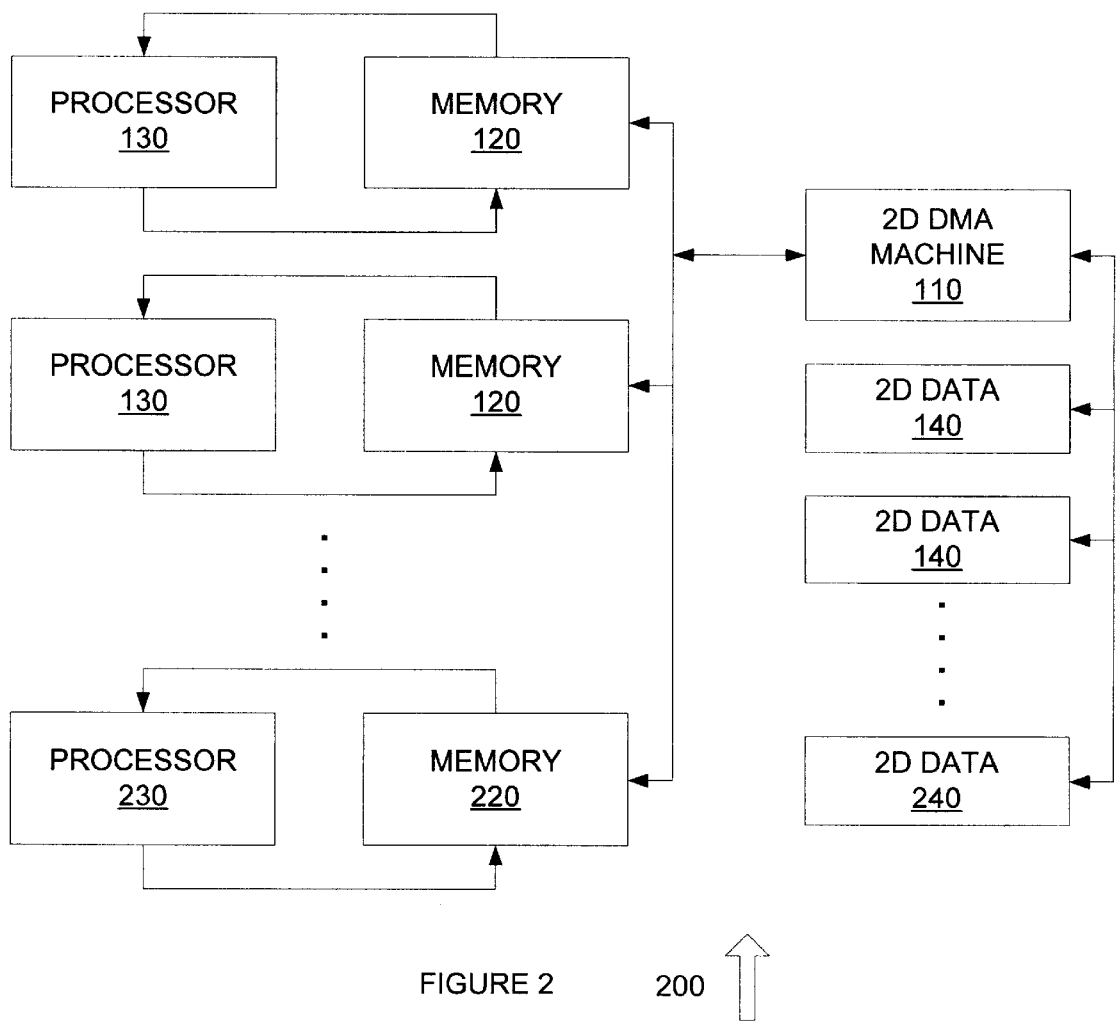
FIG. 2 is a system diagram illustrating another embodiment of a data management system built in accordance with the present invention that transfers two-dimensional data to a processor.

FIG. 2 is a system diagram illustrating another embodiment of a data management system 200 built in accordance with the present invention that transfers two-dimensional data to a processor. In particular, FIG. 2 illustrates a specific embodiment of the data management system 100 as described in FIG. 1 wherein a plurality of pluralities of two-dimensional data arrays are interfaced with a plurality of processors. Each of the processors has a dedicated memory. Similar to the data management system 100, the two-dimensional direct memory access machine 110 operates to direct the transfer of a plurality of two-dimensional data 140 to a memory 120. However, additional operation is provided by the two-dimensional direct memory access machine 110 that is employed in the data management system 200. The two-dimensional direct memory access machine 110 operates to perform data transfer of multiple pluralities of two-dimensional data 140 and 240 to a plurality of memories 120 and 220. The two-dimensional direct memory access machine 110 provides the plurality of two-dimensional data 240 to a memory 220. The processor 130 processes the plurality of two-dimensional data 140 that is temporarily stored in the memory 120. Similarly, the processor 230 processes the plurality of two-dimensional data 240 that is temporarily stored in the memory 220.

In certain embodiments of the present invention, the two-dimensional direct memory access machine 110 transfers only a subset of each of the pluralities of two-dimensional data 140 and 240 to the pluralities of memory 120 and 220. The combination of the processor 130 and the memory 120 serve only to process the plurality of two-dimensional data 140, but only a subset of the plurality of two-dimensional data 140 is processed at any given time. Similarly, the combination of the processor 230 and the memory 220 serve only to process the plurality of two-dimensional data 240, but only a subset of the plurality of two-dimensional data 240 is processed at any given time.

In other embodiments of the present invention, the two-dimensional direct memory access machine 110 transfers the pluralities of two-dimensional data 140 and 240 to the pluralities of memory 120 and 220 in an intelligent manner to optimize the processing resources provided by the memories 120 and 220. When the processor 130 is finished processing the two-dimensional data 140 that are stored in the memory 120 and the processor 230 has not yet finished processing the two-dimensional data 240 that are stored in the memory 220, two-dimensional direct memory access machine 110 transfers the unprocessed portion of the two-dimensional data 240 that are stored in the memory 220 into the memory 120 for processing using the processor 130.

This distributed and flexible approach provides additional operational performance in that not only does the two-dimensional direct memory access machine 110 select and transfer a two-dimensional portion of data to a memory for processing by at least one of a plurality of processors, but the at least one processor experiences virtually no processing down time. If a given processor has finished with the processing that it has been assigned, it does not sit idle but rather is provided with additional data that is to be processed by the two-dimensional direct memory access machine 110.

Other permutations and variations of transferring data that are selected from a number of pluralities of data to a plurality of processors utilizing the two-dimensional direct memory access machine 110 as described in the data management system 200 are envisioned within the scope and spirit of the invention.

Figure 3:
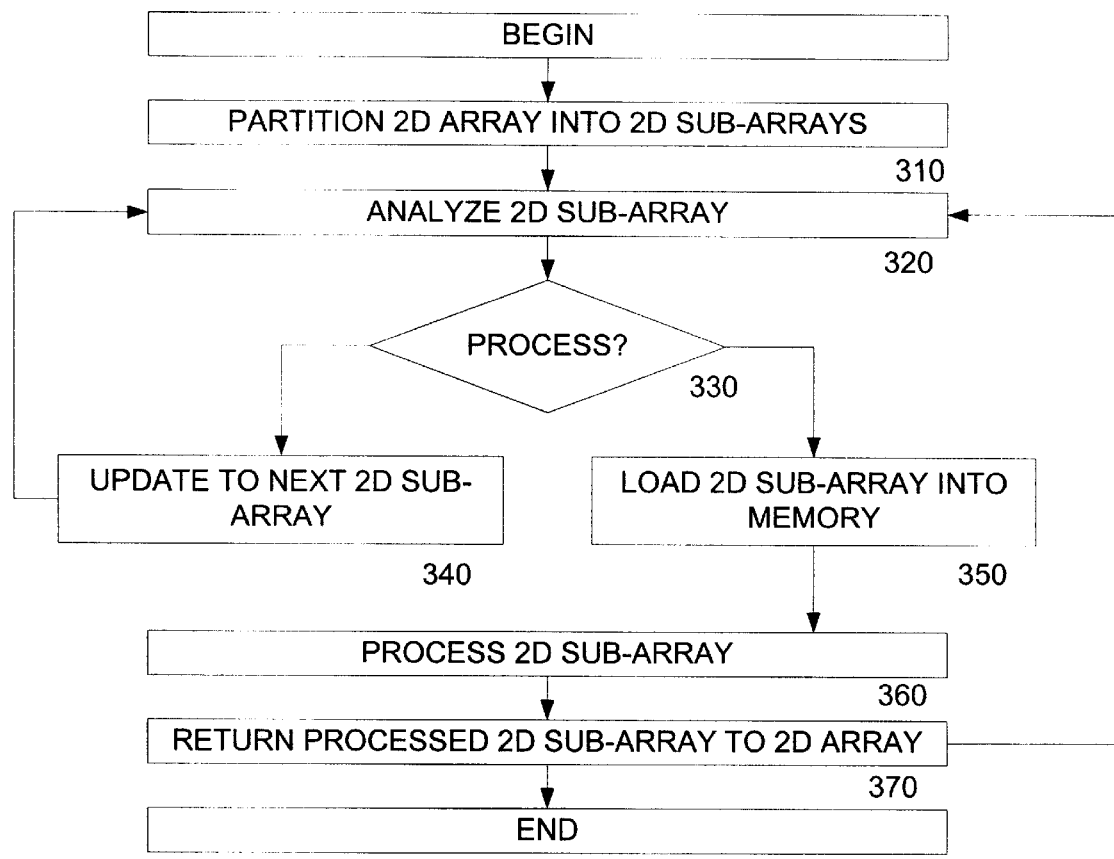
FIG. 3 is a functional block diagram illustrating a data management method performed in accordance with the present invention.

FIG. 3 is a functional block diagram illustrating a data management method 300 performed in accordance with the present invention. In a block 310, a two-dimensional data array is partitioned into a plurality of two-dimensional sub-arrays. In a block 320, at least one characteristic of at least one two-dimensional sub-array is analyzed. In a decisional block 330, it is determined whether or not the at least one two-dimensional sub-array is to be processed. If, after analysis of the at least one characteristic of the at least one two-dimensional sub-array, it is determined that the at least one two-dimensional sub-array is not to be processed, then at least one additional two-dimensional sub-array is selected in a block 340. At least one characteristic of the at least one additional two-dimensional sub-array is analyzed in the block 320. If it is then determined in the block 330 that the at least one additional two-dimensional sub-array is to be processed, the at least one additional two-dimensional sub-array is loaded into a memory in a block 350. The at least one additional two-dimensional sub-array is processed in a block 360 and returned to the two-dimensional data array in a block 370. Another at least one additional two-dimensional sub-array is analyzed in the block 320 if all of the two-dimensional data array has not yet been processed.

In certain embodiments of the invention, the loading of the at least one additional two-dimensional sub-array into the memory in the block 350 is performed using the two-dimensional direct memory access machine 110 and the memory 120 in the data management system 100 in FIG. 1. The processing performed in the block 360 is performed using the processor 130, and the returning of the processed data to the two-dimensional data array in the block 370 is performed using the two-dimensional direct memory access machine 110. In other embodiments of the invention, the data management method 300 is performed using either the distributed or subset manner described above with respect to the data management system 200. Other hardware configurations capable of performing the data management method 300 are envisioned within the scope and spirit of the invention.

FIG. 4a is a system diagram illustrating an embodiment of a data management system 400 built in accordance with the present invention that transfers a two-dimensional data array 430 to a processor 130. The data management system 400 uses a two-dimensional direct memory access machine 420 and a ping-pong memory buffer 410 to perform the transferring of the two-dimensional data array 430. The ping-pong memory buffer 410 is partitioned into at least two sub-buffers, each sub-buffer being further partitioned into an in sub-buffer and an out sub-buffer. The ping-pong memory buffer 410 transfers some data to the processor 130 from a first sub-buffer while it receives additional data into a first sub-buffer. This parallel operation ensures that the processor 130 is processing data virtually all of the time thereby providing a more efficient method of managing data.

The two-dimensional direct memory access machine 420 transfer the two-dimensional data array 430 into the in sub-buffer of at least one of the partitions of the ping-pong memory buffer 410. The two-dimensional data array 430 is then moved into the processor 130 for processing and is moved back to the out sub-buffer of the at least one of the partitions of the ping-pong memory buffer 410. The two-dimensional direct memory access machine 420 then transfers the two-dimensional data array 430, after it has been processed, back to its original position.

In certain embodiments of the invention, the two-dimensional data array 430 is partitioned into a number of two-dimensional data sub-arrays. Only one two-dimensional data sub-array is transferred to the in sub-buffer of a first partition of the ping-pong memory buffer 410 at a time. Simultaneously, a second sub-array, which was previously transferred to the in sub-buffer of a second partition of the ping-pong memory buffer 410, is being processed by the processor 130. After it is processed, it is transferred to an out sub-buffer of the second partition of the ping-pong memory buffer 410. Also performed simultaneously is the transfer of a third two-dimensional data sub-array that has been processed and is stored in the out sub-buffer of the other partition of the ping-pong memory buffer 410 to its original position using the two-dimensional direct memory access machine 420.

In certain embodiments of the invention, the two-dimensional data array 430 is partitioned into a number of two-dimensional data sub-arrays, and a first, a second, and a third two-dimensional data sub-array are all selected from the two-dimensional data array 430. The first two-dimensional data sub-array is transferred to an in sub-buffer of a first partition of the ping-pong memory buffer 410 using the two-dimensional direct memory access machine 420. The second two-dimensional data sub-array is already stored in an in sub-buffer of a second partition of the ping-pong memory buffer 410. The second two-dimensional data sub-array is transferred to the processor 130 for processing and is subsequently transferred to an out sub-buffer of the second partition of the ping-pong memory buffer 410. The third two-dimensional data sub-array is a two-dimensional data sub-array that has already been processed by the processor 130 and is stored in an out sub-buffer of the first partition of the ping-pong memory buffer 410. The third two-dimensional data sub-array is transferred to the two-dimensional data array 430 using the two-dimensional direct memory access machine 420.

FIG. 4b is a system diagram depicting another embodiment of a data management system 450 built in accordance with the data management system 400 of FIG. 4a. From one perspective, the data management system 450 is data management system 400 viewed when operating at a different point in time. The two-dimensional data array 430 is partitioned into a number of two-dimensional data sub-arrays, and a second, a third, and a fourth two-dimensional data sub-array are all selected from the two-dimensional data array 430. The second two-dimensional data sub-array is transferred to an in sub-buffer of the second partition of the ping-pong memory buffer 410 using the two-dimensional direct memory access machine 420. The third two-dimensional data sub-array is already stored in an in sub-buffer of a first partition of the ping-pong memory buffer 410. The third two-dimensional data sub-array is transferred to the processor 130 for processing and is subsequently transferred to an out sub-buffer of the first partition of the ping-pong memory buffer 410. The fourth two-dimensional data sub-array is a two-dimensional data sub-array that has already been processed by the processor 130 and is stored in an out sub-buffer of the second partition of the ping-pong memory buffer 410. The fourth two-dimensional data sub-array is transferred to the two-dimensional data array 430 using the two-dimensional direct memory access machine 420.

In certain embodiments of the invention, the data management system 450 and the data management system 400 are demonstrative of a data management system that performs processing of a plurality of image data in a sequential manner that selects various two-dimensional data sub-arrays selected from a two-dimensional data array. One two-dimensional data sub-array is processed after another until the entire two-dimensional data array is processed.

FIG. 5 is a system diagram illustrating a specific embodiment of a ping-pong memory buffer 500 built in accordance with the present invention. Similar to the ping-pong memory buffer 410 described in FIGS. 4a and 4b, the ping-pong memory buffer 500 contains at least two sub-buffers wherein each sub-buffer is further partitioned into an in and an out sub-buffer. The ping-pong memory buffer 500 contains a plurality of sub-buffers which may be used to perform the data transfer to a processor 130 in an intelligent manner that minimizes the down time of the processor 130. An in sub-buffer 520 and an out sub-buffer 510 form a sub-buffer within the ping-pong memory buffer 500. Similarly, An in sub-buffer 540 and an out sub-buffer 530 form at least one additional sub-buffer within the ping-pong memory buffer 500.

Those having skill in the art will recognize that any number of sub-buffers may be included within the ping-pong memory buffer 500 without departing from the scope and spirit of the invention. In certain embodiments of the invention, any number of sub-buffers may be employed within the ping-pong memory buffer 500 to assist in the transfer and management of data within the data management systems 100, 200, 400, and 450. Similarly, the ping-pong memory buffer 500 may be used to assist in performing perform the data management method 300 described in FIG. 3.

In view of the above detailed description of the present invention and associated drawings, other modifications and variations will now become apparent to those skilled in the art. It should also be apparent that such other modifications and variations may be effected without departing from the spirit and scope of the present invention.

What is claimed is:

1. A two-dimensional direct memory access system that maximizes processing resources in image processing systems, the two-dimensional direct memory access system comprising:

a two-dimensional direct memory access machine capable of transferring at least one plurality of data, the at least one plurality of data having substantially two-dimensional characteristics, at least one processor in signal communication with the two-dimensional direct memory access machine;

least one ping-pong memory buffer for storing the at least one plurality of data;

the at least one ping-pong memory buffer delivers at least a portion of the at least one additional plurality of data to the at least one processor; and the at least one ping-pong memory buffer receives the at least a portion of the at least one plurality of data from the at least one processor.

2. The two-dimensional direct memory access system of claim 1, further comprising a ping-pong buffer to assist in the transferring of the at least one plurality of data.

3. The two-dimensional direct memory access system of claim 1, wherein:

the at least one plurality of data is selected from a data array;

further comprising at least one memory buffer which receives the at least one plurality of data from the data array; and the at least one memory buffer transfers the at least one plurality of data to the data array.

4. The two-dimensional direct memory access system of claim 1, wherein the plurality of data having substantially two-dimensional characteristics comprises image data.

5. The two-dimensional direct memory access system of claim 1, wherein the two-dimensional direct memory access machine and the at least one processor are contained within a multi-function peripheral.

6. The two-dimensional direct memory access system of claim 1, wherein the two-dimensional direct memory access machine and the at least one processor are contained within a stand alone device.

7. The two-dimensional direct memory access system of claim 1, wherein the at least one plurality of data possess at least one characteristic; and the at least one characteristic of the at least one plurality of data determines whether the at least one processor operates on the at least one plurality of data.

8. The two-dimensional direct memory access system of claim 1, wherein the at least one processor comprises a digital signal processor.

9. A two-dimensional direct memory access system that maximizes processing resources in image processing systems, the two-dimensional direct memory access system comprising:

a two-dimensional direct memory access machine capable of transferring at least one plurality of data, the at least one plurality of data having substantially two-dimensional characteristics, the at least one plurality of data being selected from a plurality of data.

at least one ping-pong memory buffer for storing the at least one plurality of data, the at least one ping-pong memory buffer being in signal communication with the two-dimensional direct memory access machine, the two-dimensional direct memory access machine shares the at least one plurality of data to the at least one ping-pong memory buffer; and at least one processor that operates on the at least one plurality of data, the at least one processor being in signal communication with the two dimensional direct memory access machine, the at least one ping-pong memory buffer shares the at least one plurality of data to the at least one processor.

10. The two-dimensional direct memory access system of claim 9, further comprising at least one additional two-dimensional direct memory access machine that operates jointly with the two-dimensional direct memory access machine for transferring the at least one plurality of data.

11. The two-dimensional direct memory access system of claim 9, wherein the at least one memory buffer is partitioned into a plurality of sub-buffers.

12. The two-dimensional direct memory access system of claim 9, wherein the plurality of data having substantially two-dimensional characteristics comprises image data.

13. The two-dimensional direct memory access system of claim 9, wherein the two-dimensional direct memory access machine;

at least one memory buffer; and the at least one processor are contained within a multi-function peripheral.

14. The two-dimensional direct memory access system of claim 9, wherein the two-dimensional direct memory access machine;

at least one memory buffer; and the at least one processor are contained within a stand alone device.

15. A method for maximizing processing resources in image processing systems comprising:

selecting at least one plurality of data from a plurality of data;

transferring the at least one plurality of data to at least one processor using a two-dimensional direct memory access machine, the at least one plurality of data having substantially two-dimensional characteristics;

processing the at least one plurality of data using the at least one processor to generate a plurality of processed data;

returning the plurality of processed data to the plurality of data; and storing the at least one plurality of data in at least one ping-pong memory buffer prior to processing while storing a second at least one plurality of data in the ping-pong buffer memory after processing.

16. The method for maximizing processing resources of claim 15 being performed using a multi-functional peripheral.

17. The method for maximizing processing resources of claim 15 being performed using a stand alone device.

18. The method for maximizing processing resources of claim 15, wherein the at least one processor comprises a digital signal processor.

19. A two-dimensional direct memory access system that maximizes processing resources in image processing systems, the two-dimensional direct memory access system comprising:

a two-dimensional direct memory access machine capable of transferring at least one first plurality of data selected from a second plurality of data to and from the second plurality of data, the at least one first plurality of data having substantially two-dimensional characteristics; and at least one processor in signal communication with the two-dimensional direct memory access machine via a ping-pong buffer.

20. A two-dimensional direct memory access system that maximizes processing resources in image processing systems, the two-dimensional direct memory access system comprising:

a two-dimensional direct memory access machine capable of transferring at least one first plurality of data to and from a second plurality of data, the at least one plurality of data having substantially two-dimensional characteristics, the at least one plurality of data being selected from the second plurality of data;

at least one ping-pong memory buffer for storing the at least one first plurality of data, the at least one ping-pong memory buffer being in signal communication with the two-dimensional direct memory access machine, the two-dimensional direct memory access machine shares the at least one first plurality of data to the at least one ping-pong memory buffer; and at least one processor that operates on the at least one first plurality of data, the at least one processor being in signal communication with the two-dimensional direct memory access machine, the at least one ping-pong memory buffer shares the at least one first plurality of data to the at least one processor.

* * * * *

UNITED STATES PATENT AND TRADEMARK OFFICE
CERTIFICATE OF CORRECTION

PATENT NO.    : 6,449,664 B1
DATED         : September 10, 2002
INVENTOR(S)   : Honary et al.

It is certified that error appears in the above-identified patent and that said Letters Patent is hereby corrected as shown below:

Column 1,
Line 1, "TWO DIMENSIONAL" should read -- TWO-DIMENSIONAL --.

Column 6,
Lines 65-66, "to assist in performing perform the data" should read -- to assist in performing the data --.

Column 7,
Line 18, before "least" insert -- at --.
Line 67, change "." to -- ; --.

Column 17,
Line 15, change "," to -- ; --.

Signed and Sealed this

Twenty-fourth Day of June, 2003

JAMES E. ROGAN
*Director of the United States Patent and Trademark Office*